US007344620B2

(12) United States Patent
Jung

(10) Patent No.: US 7,344,620 B2
(45) Date of Patent: Mar. 18, 2008

(54) ULTRASONIC SONOTRODE

(75) Inventor: Rainer Jung, Berlin (DE)

(73) Assignee: Bandelin Electronic GmbH & Co. KG, Berlin (DE)

( * ) Notice: Subject to any disclaimer, the term of this patent is extended or adjusted under 35 U.S.C. 154(b) by 250 days.

(21) Appl. No.: 11/125,858

(22) Filed: May 10, 2005

(65) Prior Publication Data

US 2005/0247408 A1 Nov. 10, 2005

(30) Foreign Application Priority Data

May 10, 2004 (DE) ...................... 10 2004 024 214

(51) Int. Cl.
*B32B 37/00* (2006.01)

(52) U.S. Cl. ............................... 156/580.2; 310/323.18

(58) Field of Classification Search ............... 156/73.1, 156/73.2, 73.4, 580.1, 580.2; 228/1.1, 110.1; 310/321, 323.01, 323.18
See application file for complete search history.

(56) References Cited

U.S. PATENT DOCUMENTS

| | | | | | |
|---|---|---|---|---|---|
| RE28,642 | E | * | 12/1975 | Davis | 228/1.1 |
| 4,651,043 | A | | 3/1987 | Harris et al. | |
| 6,776,323 | B2 | | 8/2004 | Schmidt | |
| 7,163,442 | B2 | | 1/2007 | Jacquorie et al. | |
| 2005/0031499 | A1 | | 2/2005 | Meier | |

FOREIGN PATENT DOCUMENTS

| | | |
|---|---|---|
| DE | 1903324 C3 | 6/1971 |
| DE | 2355333 | 10/1974 |
| DE | 02607038 | 8/1977 |
| DE | 2607038 A1 | 8/1977 |
| DE | 3328614 A1 | 12/1984 |
| DE | 03635968 | 4/1987 |

(Continued)

OTHER PUBLICATIONS

English translation of German Examination Report of International Application DE 10 2004 024 214.3 dated Jan. 13, 2005.

(Continued)

*Primary Examiner*—James Sells
(74) *Attorney, Agent, or Firm*—Kaplan Gilman Gibson & Dernier LLP; Matthew B. Dernier

(57) ABSTRACT

An ultrasonic sonotrode for irradiating ultrasonic energy into fluid or pasty media, wherein the ultrasonic sonotrode in the longitudinal direction (z) includes: a coupling section for coupling an active ultrasonic system which excites longitudinally in the longitudinal direction (z); a base section, wherein the largest dimension of the base section transverse to the longitudinal direction (z) is larger than the length of the base section in the longitudinal direction (z), wherein the dimensions of the base section transverse to the longitudinal direction in the border region to the transition section are always $\geqq\lambda/4$ and the shortest length of the base section in the longitudinal direction $(z)<\lambda/4$; a transition section for the reduction of the cross section in at least one cross-section with respect to the base section; and a flat section with an end-face region as an irradiation surface, wherein the flat section is divided by way of at least one slot into several tongues which are unconnected in the end-face region.

17 Claims, 2 Drawing Sheets

FOREIGN PATENT DOCUMENTS

| | | | |
|---|---|---|---|
| DE | 3635968 | C2 | 4/1987 |
| DE | 10160496 | | 11/2002 |
| DE | 10160496 | A1 | 11/2002 |
| DE | 10148916 | | 4/2003 |
| DE | 10148916 | A1 | 4/2003 |
| DE | 10212266 | | 4/2003 |
| GB | 2344487 | * | 7/2000 |

OTHER PUBLICATIONS

English translation of German Examination Report of International Application DE 10 2005 022 179.3 dated May 5, 2007.

* cited by examiner

ULTRASONIC SONOTRODE

BACKGROUND OF THE INVENTION

The invention relates to an amplitude-transforming ultrasonic sonotrode which may be excited by way of an active, longitudinally functioning ultrasonic system. The invention further relates to an ultrasonic means which contains an ultrasonic sonotrode according to the invention.

In ultrasound technology which covers many fields, in particular in laboratory and processing technology, so-called ultrasonic disintegrators or ultrasonic homogenisators have been applied for decades, with chiefly longitudinally functioning, rod-like ultrasonic sonotrodes which are driven via an active ultrasonic system, function according to the longitudinal oscillation mode, mostly have a length $n \times \lambda/2$ and apply a reproducible ultrasonic power via their end-faces.

This tried and tested technology permits the introduction of very high ultrasonic amplitudes into fluids or pasty media via the end-face of the sonotrodes, often with the help of so-called amplitude transformers (boosters). As rule, the amplitude transformation is effected at the cost of a reduction of the cross-section of the mostly circular end-face or irradiation surface. If one assumes that the transverse dimensions—for example the sonotrode diameter—usually lies below $\lambda/4$-material wavelength, one may assume approximately equal ultrasonic amplitudes (deflection and phase) at the end-face of the sonotrode. This ensures an exact and reproducible operation, for example in analysis, since the deflection of the sonotrode is always effected in a very uniform manner over the whole end-face, has approximately equal amplitude values and effects caused by the ultrasound may be linked to this parameter.

As a rule, sonotrodes and tips of such sonotrodes consist of very oscillation resistant and simultaneously low-loss materials such as titanium for example. Special ceramic or glass materials are also applied.

Micro-pipetting or deep-well plates play an increasing role in the analysis and the preparation of samples. With the acoustic irradiation of these very small sample volumes, called wells, the acoustic irradiation effort for micro-pipetting plates with 96 or more wells for example is very high with a single and necessarily thin sonotrode tip.

Various ideas for solutions have been made to overcome this exemplary problem. On the one hand one attempts to acoustically irradiate a complete micro-pipetting plate indirectly with ultrasound, from below via the base with ultrasound. For this, the plate is applied into a shallow ultrasound bath, wherein the bath consists of a turned groove or recess and of a very thick sonotrode at the end-face, which for this purpose is operated upside down. An active ultrasonic transducer which is firmly coupled to the sonotrode and which is fed by an HF generator serves as an ultrasonic source. However the influence of a transverse contraction increases significantly with an increasing diameter or thickness of sonotrodes, since the diameter of the sound conductors to the quarter wavelength in the material is larger than one already for relatively low ultrasonic frequencies. A formation of additional oscillation nodes, phase differences of the oscillation and amplitude distortions occur at the end-face of these sonotrodes. A very irregular and non-reproducible sound irradiation of the wells in the micro-pipetting plate via the large bath or irradiation surface is the result of this.

A further solution possibility may be derived from the very wide and simultaneously narrow sonotrodes which are often used in ultrasonic welding technology.

Such special sonotrodes are most usually also driven via an active ultrasonic system. They however have the disadvantage that their wide and simultaneously narrow end-face does not uniformly irradiate the high ultrasonic amplitudes due to the coupled longitudinal and bending oscillation mode. Zones with a greater and weaker amplitude alternate along the end-face. The simultaneous and direct sound irradiation of several wells of a micro-pipetting plate in principle would be able to be carried out via the distanced placing of smaller and thinner tips in a row on this surface (end-face). However one may not achieve any identical sound irradiation results in the wells of micro-pipetting plates on account of the previously mentioned differences with the deflection amplitudes.

A further solution possibility for the sound irradiation of the smallest of sample quantities in micro-pipetting plates is described in DE 101 48 916 A1.

The core and simultaneously disadvantage of the arrangement described there is the fact that the width of the emitting location of the sound waves does not exceed the width or the diameter of the active, driven ultrasonic system. On account of this, one already requires several transducers with wave-transmitting intermediate elements up to the emitting location for the sound irradiation of only one row of a micro-pipetting plate. For this reason already two units of the arrangement described there are required merely for the short side of a micro-pipetting plate. Added to this is the effort and expense for the exact positioning and mounting of the units with respect to the plate as well as the increased electronic activation effort for two or more active ultrasonic systems by the HF-generator.

SUMMARY OF THE INVENTION

It is therefore the object of the present invention to provide an ultrasonic sonotrode which may emit high ultrasonic amplitudes of approximately equal amplitude, phase position and direction onto a surface (for example a narrow rectangular surface) in a simple and inexpensive manner.

This object is achieved by the ultrasonic sonotrode according to the invention or the ultrasonic means according to the invention.

The ultrasonic sonotrode according to the invention is suitable for the irradiation of ultrasonic energy into liquid or pasty media, wherein the ultrasonic sonotrode comprises essentially the following sections in succession in the longitudinal direction:

- a coupling element for coupling an active ultrasonic system which excites longitudinally in the longitudinal direction,
- a base section, wherein the largest dimension of the base section transverse to the longitudinal direction is larger (preferably more than twice as large) than the length of the base section in the longitudinal direction, wherein the dimensions of the base section transverse to the longitudinal direction in the border region to the transition section are always $\geqq\lambda/4$ and the shortest length of the base section in the longitudinal direction $(z)<\lambda/4$,
- a transition section for the reduction of the cross section in at least one cross-sectional area with respect to the base section as well as
- a flat section with a length of preferably approx. $\lambda/4$ material wavelength and with an end-face region as an irradiation surface, wherein the flat section is divided by way of at least one slot into several tongues which are unconnected in the end-face region.

With this arrangement it is possible by way of a single exciter (for example a piezoelectrically exciting disk) to carry out rectangular ultrasonic oscillation which within the context of the invention has an approximately equal amplitude, phase position and direction.

With regard to the longitudinal material wavelength λ, the following basically applies:

$$\lambda = \frac{c_L}{f}$$

where $C_L$ is the sonic speed of the sonotrode (thus if the sonotrode is of titanium, $C_L$ is approximately equal to 4,900 m/s), and f is the exciting frequency, for example 20 kHz. For a certain sonotrode thus with the excitation with a defined frequency (for example ultrasound of 20-25 kHz) one may accordingly determine λ.

Here it is useful for the base section in its greatest dimension transverse to the longitudinal direction to be larger than in the longitudinal direction. "Largest dimension" is here to be understood, for example with a rectangular cross section transverse to the longitudinal axis as the diagonal of the area, with a circle the diameter, with an ellipse the length of the longest axis, etc.

The invention envisages the flat section comprising at least one slot which preferably runs up to into the region of the transition section. By way of this the flat section is divided into several "tongues". It has been shown that a further homogenization of the longitudinally irradiated ultrasonic field over the surface section to the end-face is give by way of this.

With this, according to the invention, the dimension of the base section transverse to the longitudinal direction in the border region to the transition section is always more than λ/4. This means that a larger dimension than λ/4 in all orthogonals to the transverse axis is given in the border region to the transition section (thus in the "uppermost" section of the base section which is orientated (directed) towards the transition region).

The shortest length of the base section in the longitudinal direction on the other hand is significantly less than λ/4. It is thus evident that the total length of the sonotrode according to the invention over the flat section and base part with the coupling section does not correspond to a classic halve-wave resonator, since the base section is "too short" or transversely "too thick" for this. On account of this large transverse dimension and small longitudinal dimension, the base part executes a "volume oscillation" which may not be allocated to any simplified/classic form of oscillation. The arising volume oscillation would rather be characterized as a biaxial oscillation which consists of a transversal and longitudinal component.

A further important point is the fact that the flat section is divided by way of a slot into several tongues which are unconnected in the end-face region. Here it is essential that these "tongues" indeed really are tongues, thus project freely in the end-face region and inasmuch as this is concerned are not connected to one another. The tongue width which arises thus corresponds to maximally half of the flat section b, that is to say b/2, and lies significantly below the λ/4 length in the longitudinal direction, and by way of this ensures that the tongues in the longitudinal direction may oscillate longitudinally in the same manner. The length of the slot (thus also the length of the tongues) usually extends up to into the transition section, but not into the base section and corresponds to about λ/4-length in the longitudinal direction.

A further important delimitation of the subject-matter of the invention to the state of the art is the fact that the irradiation surface of the flat section as a whole or of the individual tongues is unusually small. The flat section which is usually rectangular, here has a "short" side edge, whose length (largest extension, measured at the free end) is maximally ⅛ to 1/12 of the largest dimension of the base section transverse to the z-direction (thus of the longitudinal axis direction of the sonotrode). The tapering of the flat section or of the individual tongues towards the irradiation side which is thus achieved effects an additional amplification of the ultrasonic amplitude. The degree of amplification may be deduced from the ratio of the cross-sectional reduction of the tongue areas on the base part and on the tongue end.

One may exploit these advantages according to the invention with the ultrasonic means according to the invention which apart from the sonotrode according to the invention comprises an active ultrasonic system which may be coupled to this.

At the same time it is quite remarkable that the largest cross sectional area of the base part is possible larger (preferably more than thrice) than the coupling area of the coupling section towards a coupled active ultrasonic system. Thus it is indeed possible to effect a "cross sectional enlargement" from an ultrasonic system to be coupled, to the sonotrode (in particular to the base part/flat section).

The invention is remarkable due to the fact that the basis section which is excited into oscillation by way of a longitudinally oscillator capable of being coupled does not obey any usual oscillation mode, but executes a volume oscillation which is determined uniquely by its shaping and mass. This volume oscillation with regard to the methods until now may not be physically described as a simple individual oscillation mode. It rather corresponds to a biaxial oscillation mode with a combination of transversal and longitudinal components. It is however very surprising that by way of the reduction of the cross section and mass from the base section via the transition section to the flat section, finally a very homogeneous ultrasonic field arises at the open end-face of the flat section.

Advantageous further formations of the invention are shown in the dependent patent claims.

One advantageous further formation envisages the ultrasonic sonotrode being designed as one piece. It is thus possible to manufacture this sonotrode with the simplest of means, also the long-term durability is advantageously influenced by way of that fact that it is possible for joints not to be present within the sonotrode and boosters etc. do not need to be coupled.

A further advantageous formation envisages the ultrasonic sonotrode being of metal. This is also advantageous with regard to the single-piece manufacturability, since here one may manufacture a durable element in a simple manner.

A further advantageous formation envisages the total length of the sonotrode n the longitudinal direction being maximally 1.2×λ/2 the longitudinal material wavelength of the sonotrode, preferably λ/2 of the longitudinal material wavelength of the sonotrode.

Thus it is also possible to limit the total length of the sonotrode (including coupling section, base section, transition section as well as flat section) to maximally 1.2×λ/2 or 1×λ/2 so that the total arrangement here has a relatively low volume and very high ultrasonic powers may be achieved by the oscillator capable of being coupled on.

A further advantageous formation envisages recesses being present on the base section for matching (adapting) the mass and/or the amplitude. These for example may be bores on the periphery of the base section. It is however possible to provided indentations on the base section in the extension of the narrow sides of the flat section (see FIG. 3 further below). By way of this, on the one hand the mass of the base section is reduced and on the other hand the longitudinal irradiation of the end-face of the flat section is yet further improved.

A further advantageous formation envisages the transition section between the base section as well as the flat section having a discontinuous or (preferably) continuous course. The continuous course at the same time may be circular-arc-shaped, linear or exponential.

A further advantageous formation envisages the flat section on its wide side having an extension which is smaller than, equal to or larger than the largest dimension of the base section transverse to the longitudinal direction. With the variant "equal" at the same time, in a plan view, practically a constant width from the base section via the transition section to the flat section may be recognized (as represented in FIGS. 1, 2, 3, and 4, however a reduction of cross section results in the cross sections rotated to this about the longitudinal direction).

It is however also possible for the wide side of the flat section to taper towards the end-face also in this cross section (this shown in the FIGS. 1 and 4). A widening is also possible.

The flat section preferably comprises a parallelepiped cross section. It is however also possible for the parallelepiped shape to be modified for example in that greatly rounded edges are provided so that here a "elliptical" cross section is shown in a plan view in the longitudinal direction on the sonotrode tip or on the irradiation surface.

A further advantageous formation envisages the flat section comprising grooves, sinks, bores or cuts in the end-face region. A homogenization or fine "tuning" of the ultrasonic field to be emitted may be controlled by way of this.

A particularly advantageous formation envisages the flat section in the end-face region comprising at least one, preferably several rod-like tips preferably arranged at uniform distances. These may be formed out of the sonotrode itself but also out of another material which may also not be of metal. It is essential that these tips need not have a resonance length, which means to say that on account of smaller dimensions or smaller masses, these practically are of no importance to the total mass of the sonotrode. With regard to the length too these are kept small and taken per se do not represent a sonotrode by themselves, so that the tips in the longitudinal direction have an extension of maximally λ/4, preferably less than λ/8, wherein λ relates to the material wavelength of the ultrasonic sonotrode.

The advantages of the ultrasonic sonotrode according to the invention may be exploited with an ultrasonic means according to the invention. Here it is particularly advantageous that the coupling section may have indeed a lower area (cross-sectional area perpendicular to the longitudinal direction) than for example the cross section of the base section. The coupling section may for this reason be directed (matched) for example to common, active, longitudinally functioning oscillation systems. For example the coupling area of the coupling section may be 0.8 to 1.2, preferably 0.9 to 1.1 times the coupling area of an active, for example piezoelectric system. This system may at the same time be designed such that it produces longitudinal oscillations in the region between 16 to 50 kHz, preferably low frequency ultrasound in the region of 18 to 22 kHz.

After the essential aspects of the patent claims have been dealt with, the advantages of the invention are abbreviated once again in other words in the following.

The advantage of the invention is the provision of an ultrasonic sonotrode driven via only one active ultrasonic system, with which high ultrasonic amplitudes of approximately the same amplitude, phase position and direction may be emitted over a very wide and simultaneously narrow end-face. A further advantage is that the homogeneously oscillating end-face or irradiation surface of this sonotrode may be machined or deformed in certain limits, for example, for incorporating small grooves, sinks, or bores or also for example for receiving thin or low-mass tips for the sound irradiation of micro-pipetting plates or similar sound irradiation tasks.

For achieving these advantages it is important that the sonotrode, to the coupling or screw connection side consists of a base part, executing volume oscillations, with a considerable transverse dimension (the transverse dimension may be more than λ/4 of the longitudinal material wavelength of the sonotrode), of a small length in the longitudinal direction of the sonotrode (significantly lower than λ/4 of the longitudinal material wavelength of the sonotrode) and of a longitudinally oscillating flat section connecting after a transition section, wherein amplitude-transformed ultrasonic amplitudes may be irradiated via the wide and simultaneously narrow end-face of this flat section, said amplitudes being equally large in magnitude and phase. For optimizing the oscillation behavior and for matching the output amplitudes on the end-face, it is useful to subdivide the flat part in the longitudinal direction towards the irradiation side by way of cuts.

The longitudinal dimension of the ultrasonic sonotrode according to the invention corresponds preferably to λ/2 of the resonance length of common laboratory sonotrodes. In contrast the transverse dimension of the relatively short base section preferably lies significantly above λ/4 of the material wavelength.

The base part does not obey any common oscillation mode but executes a volume oscillation which is determined solely by its shape and mass. The rectangular flat part which connects to the base section or the subsequent transition section oscillates essentially in a longitudinal manner. Its length is approximately λ/4 of the material wavelength whose total width over the tongues corresponds preferably to the transverse dimension of the base section but may also deviate from this. For achieving a very uniform amplitude distribution and equally high deflections on the narrow irradiation side it is useful to provide the flat side with thin slots from the irradiation side up to the base part. It is furthermore useful not to form the transition section between the base and flat section in an abrupt manner, but via a continuous function for example via a radius.

The mass ratio between the base section and transition section to the flat section essentially determines the possible amplitude transformation or amplitude amplification between the coupling side and the irradiations side of the sonotrode according to the invention. One may realize amplification factors of up to 10, depending on the geometrical dimensioning, for example also with a very thin or greatly tapered flat part, and depending on the mass ratio.

High and uniphase ultrasonic amplitudes may be irradiated with the sonotrode according to the invention over a narrow irradiation surface with a considerable width, which is a multiple of the transverse dimension of a common longitudinal oscillation system.

The transverse dimension of the base section and thus the width of the flat section of the sonotrode according to the invention may be selected at least so large that it corresponds to the longitudinal dimension of a common micro-pipetting plate. Small tips of the sonotrode material or of non-metallic materials may be applied on the narrow and wide irradiation surface, with which then simultaneously a complete row of a micro-pipetting plate may be irradiated with sound. The applied tips may and should be very short and thin. By way of this on the one hand they detune the sonotrode according to the invention only to an insignificant extent and on the other hand this is also useful for small sample volumes.

Due to the equal deflection amplitudes, a very uniform and reproducible sound irradiation of the wells in micro-pipetting plates is possible. On account of the large width of the sonotrode according to the invention on the irradiation side, a complete row of a longitudinal side of today's common micro-pipetting plates may be sound-irradiated in one go. By way of the fact that the sonotrode according to the invention only requires one active oscillation system on the coupling side, the effort with regard to manufacture, matching, adjusting and costs is significantly improved in contrast to the state of the art. The sonotrode according to the invention may be manufactured in a modern rational manner on modern lathe and milling machining centers and thus does not represent a cost factor with regard to the machining.

BRIEF DESCRIPTION OF THE DRAWINGS

Preferred embodiments of the sonotrode according to the invention are described by way of the subsequent figures.

There are shown in.

DETAILED DESCRIPTION OF THE INVENTION

Figure 1:
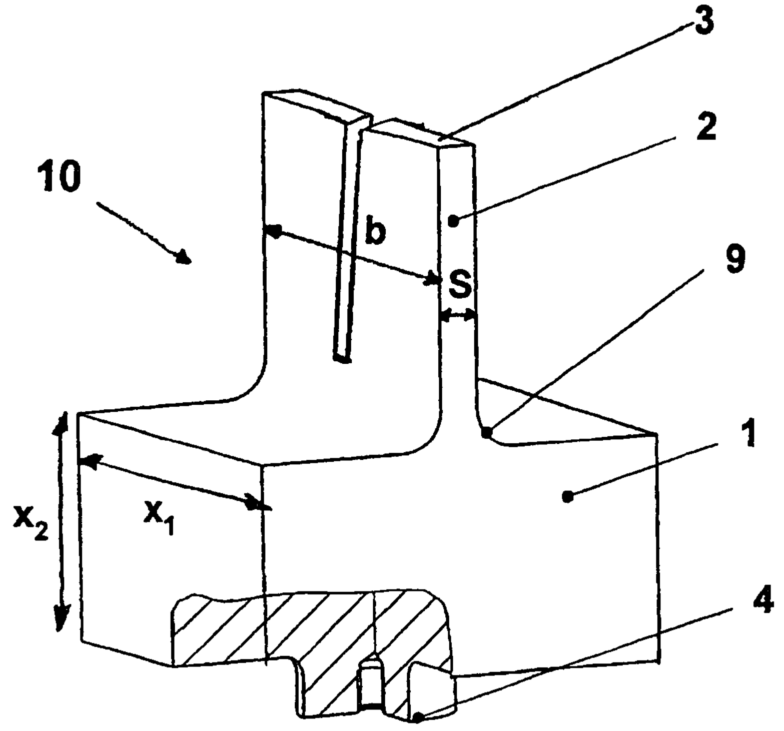
FIG. 1 a sonotrode according to the invention with a parallelepiped base section of a large transverse dimension, FIG. 2 a sonotrode according to the invention with a round, plate-like base section, FIG. 3 a further sonotrode according to the invention, FIG. 4 an ultrasonic means according to the invention

FIG. 1 shows an ultrasonic sonotrode according to the invention. The general description of the present invention is described by way of the ultrasonic sonotrode shown in FIG. 1. With the description of the subsequent figures then with regard to the context, that which has been said with regard to FIG. 1 also applies to the other figures unless expressly stated otherwise.

The ultrasonic sonotrode 10 shown in FIG. 1 is suitable for irradiation of ultrasonic energy into fluid or pasty media. The ultrasonic sonotrode in the longitudinal direction (in the longitudinal direction z) has the following successive sections:

- a coupling section 4 for coupling an active ultrasonic system (see FIG. 4) which excites longitudinally in the longitudinal direction z. The screw attachment of a corresponding ultrasonic system which is preferably designed as a piezoelectric oscillation system is effected for example by way of a screw bolt, and a corresponding threaded bore is to be seen in FIG. 1 on the lower side of the sonotrode. The cylinder-shaped section on the lower side of the sonotrode is the coupling section 4.

A base section 1 connects to this coupling section 4 (after a small transition region which however should still to be allocated to the coupling section). This base section comprises an essentially parallelepiped structure and is designed in a very solid manner. The base section 1 in the largest dimension transverse to the longitudinal axis has a dimension which is larger than the length of the base section in the longitudinal direction. This means that the essentially parallelepiped base section has its smallest extension in the z-direction and its greatest extension in the x-y plane. This greatest extension in the x-y plane is the longest area diagonal of the [right] parallelepiped in the x-y plane (in this context and in FIG. 2, this would be the diameter as a corresponding dimension). The base section is essentially excited into "volume oscillations" and this term has been dealt with further above.

The dimension ($x_1$) of the base section transverse to the longitudinal section in the border region to the transition section here is always larger than or at least equal to $\lambda/4$. In FIG. 1 this is indicated by a double arrow. Even at the "narrower" side of the rectangular cross section there $x_1$ is still larger or at least equal to $\lambda/4$. Irrespective of which cross section the base section has (ellipsoid, circular, polygonal), $x_1$ is always $\geqq \lambda/4$.

The shortest length ($x_2$) of the base section in the longitudinal direction is always smaller than $\lambda/4$. This dimension may likewise be deduced in FIG. 1.

A transition section 9 then connects continuing in the positive z-direction. This shows an essentially circular-periphery-shaped tapering course and opens into an essentially parallelepiped flat section. This flat section has a narrow side of the length s as well as a wide side of the length b, wherein the length of the wide side b corresponds to an edge length of the parallelepiped of the base section 1, thus here the width in the region of the flat section is exactly as large as in the region of the base section. The length b here however may also be designed smaller or also larger than the width of the base section. The flat section then on its upper side has an end-face region 3 which serves as an irradiation surface for longitudinal oscillations.

The length S of the narrow sides is preferably only ⅛ to $\frac{1}{12}$ as large as the shortest dimension of the cross section transverse to the longitudinal direction ($x_1$).

The flat section is furthermore divided by at least one slot into several tongues which are unconnected in the end-face region. By way of this there is no connection of the tongues at their end which is distant to the base section. The tongues thus project in a free manner. This is significantly different to the usual "slots" which are closed at both sides. On account of the open slot division into tongues of a small width ($\ll\lambda/4$) and of a short length s, one achieves a continuous longitudinal oscillation in the longitudinal direction of the flat section. The unconnected end-face region additionally prevents the occurrence of transversal oscillation components and ensures amplitudes of the same magnitude and phase at the tongue ends. A tapering of the flat section towards the tongue ends effects an additional amplitude transformation.

The complete ultrasonic sonotrode is of one piece and consists of metal. The length of the sonotrode 10 in the longitudinal direction (measured from the lower side of the coupling section 4 up to the upper side of the end-face region 3) is $1.1\times\lambda/2$ of the longitudinal material wavelength of the sonotrode.

Figure 2:
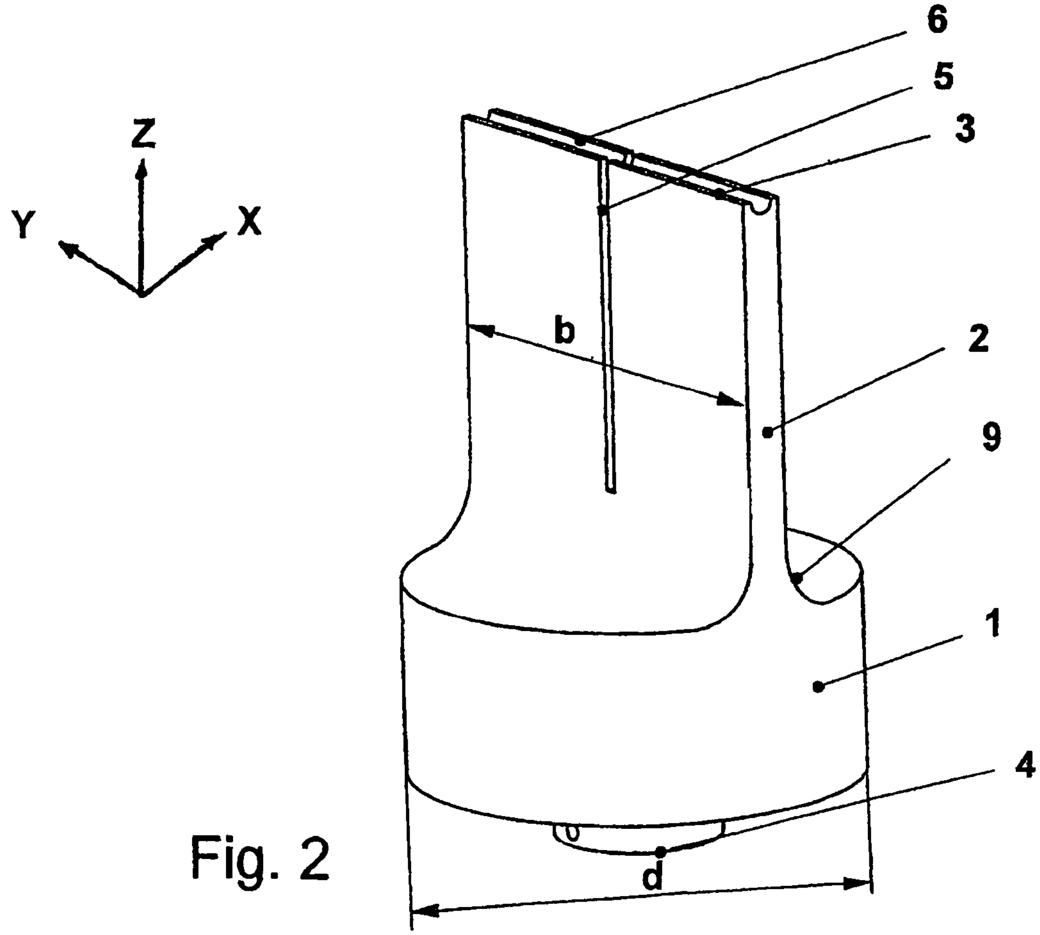

FIG. 2 shows a further embodiment of a sonotrode according to the invention, wherein here in contrast to the sonotrode shown in FIG. 1, the base section 1 has a round cross section.

The flat section here also comprises a slot 5 which runs from the upper edge of the end-face region 3 up to into the transition section 9. This slot divides the flat section into two approximately equally large tongue-like sections which both run in the z-direction. The slot here serves for the improved homogenization of the longitudinal sound field to be irradiated. Furthermore an assembly bore is to be seen laterally on the coupling section 4.

The ultrasonic sonotrode in FIG. 2 furthermore shows a groove 6 or channel-like indentation which runs along the wide side b centrally in the end-face region, so that four rectangular irradiations surfaces are given in the z-direction at the uppermost end, which emit ultrasonic energy in a very concentrated manner.

Figure 3:
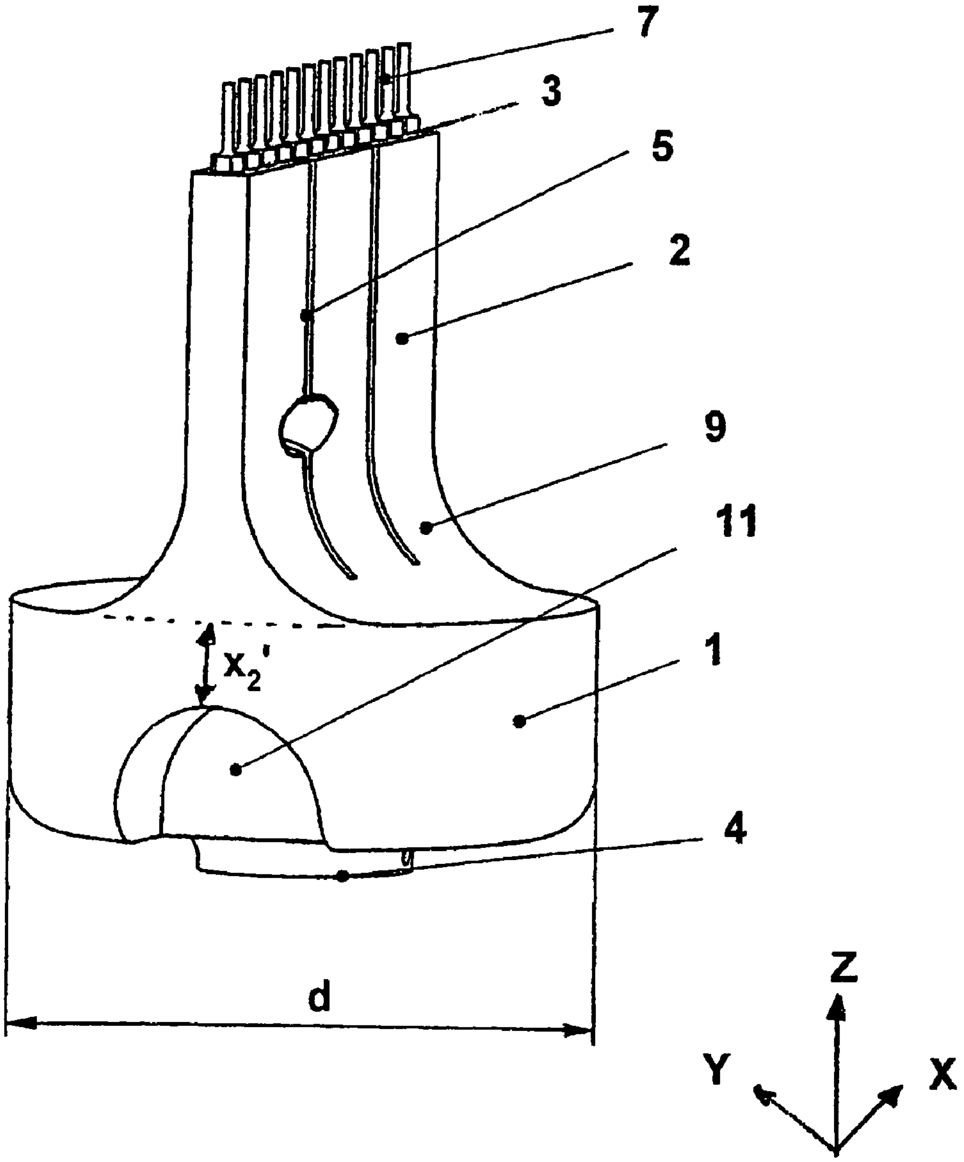

FIG. 3 shows a further embodiment of an ultrasonic sonotrode according to the invention. This additionally to the sonotrode shown in FIG. 2 shows a concavity 11 in the base section, wherein this concavity is essentially directed in the direction of the narrow side of the flat section.

In contrast to the sonotrode shown in FIG. 2 here the flat section 2 has in total two longitudinal slots so that the flat section 2 as a whole comprises three "tongues". Here the slots in each case in regions, for example in pairs, may comprise circular cuts.

Here too it is to be seen that the dimensions of the base section transverse to the longitudinal direction (thus the diameter d) in the border region to the transition section (with regard to this see the dashed line in FIG. 3) are always $\geqq\lambda/4$ and the shortest length of the base section in the longitudinal direction $<\lambda/4$ (see $x'_2$).

Several rod-like tips 7 which are arranged at uniform distances are shown on the end-face region 3, which are of metal. However their dimension or their mass is so small that these have no resonance length. The tips in the longitudinal direction z have an extension of less than $\lambda/8$, wherein here $\lambda$ relates to the material wavelength of the ultrasonic sonotrode.

Figure 4:
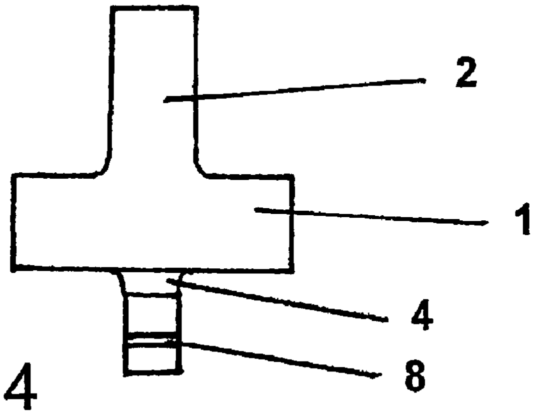

Finally FIG. 4 is referred to. This shows an ultrasonic means 12 ready for operation. This consists of an ultrasonic sonotrode on whose coupling section 4 an active ultrasonic system 8 is shown (here a piezoelectric drive system is to be seen centrally). The lower area of the coupling section at the same time corresponds essentially to the cross sectional area of the ultrasonic oscillator system 8 to be coupled. The ultrasonic oscillator system 8 is designed to excite at 20 kHz.

LIST OF REFERENCE NUMERALS 1 base section
2 flat section
3 end-face region
4 coupling section
5 slots
6 grooves
7 tips
8 active ultrasonic system
9 transition section
10 ultrasonic sonotrode
11 recess
12 ultrasonic means
x, y, z spatial directions
b wide side
s narrow side

The invention claimed is:

1. An ultrasonic sonotrode for irradiating ultrasonic energy into fluid or pasty media, wherein the ultrasonic sonotrode in a longitudinal direction (z) comprises:
   - a coupling section for coupling an active ultrasonic system which excites longitudinally in the longitudinal direction (z);
   - a base section, wherein a largest dimension of the base section transverse to the longitudinal direction (z) is larger than a length of the base section in the longitudinal direction (z), wherein dimensions of the base section transverse to the longitudinal direction in a border region to the transition section are always $\geqq\lambda/4$ and a shortest length of the base section in the longitudinal direction (z) is $<\lambda/4$;
   - a transition section for the reduction of a cross section in at least one cross-section with respect to the base section; and
   - a flat section with an end-face region as an irradiation surface, wherein the flat section is divided by way of at least one slot into several tongues which are unconnected in the end-face region.

2. An ultrasonic sonotrode according to claim 1, wherein the elements are integrated as one piece.

3. An ultrasonic sonotrode according to claim 1, wherein the sonotrode is formed of metal.

4. An ultrasonic sonotrode according to claim 1, wherein at least one of:
   - the length of the sonotrode in the longitudinal direction (z) is maximally $1.2\times\lambda/2$ of a longitudinal material wavelength of the sonotrode; and
   - the length of the sonotrode in the longitudinal direction (z) is maximally $\lambda/2$ of the longitudinal material wavelength of the sonotrode.

5. An ultrasonic sonotrode according to claim 1, wherein recesses for matching/adaptation of a mass and/or amplitude are provided on the base section, which are preferably designed as bores on a periphery thereof, and/or as indentations directed in a direction of narrow sides of the flat section.

6. An ultrasonic sonotrode according to claim 1, wherein the transition section has a continuous or discontinuous course, wherein the continuous course is at least one of linear, arc-like and exponential.

7. An ultrasonic sonotrode according to claim 1, wherein the at least one slot runs maximally up to the region of the transition section.

8. An ultrasonic sonotrode according to claim 1, wherein the flat section on its wide side has an extension which is smaller than, equal to or larger than the largest dimension of the base section transverse to the longitudinal direction.

9. An ultrasonic sonotrode according to claim 1, wherein at least one of:
   - the flat section is a parallelepiped; and
   - the flat section has a rectangular cross section.

10. An ultrasonic sonotrode according to claim 1, wherein the flat section in the end-face region comprises grooves, sinks, bores or cuts.

11. An ultrasonic sonotrode according to claim 1, wherein at least one of:
   - the flat section in the end-face region comprises at least one rod-like tips; and
   - the flat section in the end-face region comprises a plurality of rod-like tips which are arranged at uniform distances.

12. An ultrasonic sonotrode according to claim 11, wherein at least one of:

the tips include sonotrode material or another material; and the tips include a metallic or a non-metallic material.

13. An ultrasonic sonotrode according to claim 11, wherein the tips have no resonance length.

14. An ultrasonic sonotrode according to claim 11, wherein at least one of:

the tips in the longitudinal direction (z) have an extension of maximally λ/4; and the tips in the longitudinal direction (z) have an extension of less than λ/8, wherein λ relates to a material wavelength of the ultrasonic sonotrode.

15. An ultrasonic means comprising:

a sonotrode according to claim 1; and an active ultrasonic system which may be coupled on the coupling section, wherein the largest cross-sectional area of the base section is larger than the coupling area of the coupling section to the active ultrasonic system.

16. An ultrasonic means according to claim 15, wherein at least one of:

the coupling area of the coupling section is 0.8-1.2 of the coupling area of the active system; and the coupling area of the coupling section is 0.9-1.1 of the coupling area of the active system.

17. An ultrasonic means according to claim 15, wherein at least one of:

the active ultrasonic system produces longitudinal oscillation in the region between 16 to 50 kHz; and the active ultrasonic system produces longitudinal oscillation in the region between 18 and 22 kHz.

* * * * *